June 24, 1952  F. WALLER  2,601,347

MOTION-PICTURE APPARATUS WITH PNEUMATIC PULLDOWN FOR FILM

Filed June 24, 1949  2 SHEETS—SHEET 1

INVENTOR
Fred Waller
BY
ATTORNEY

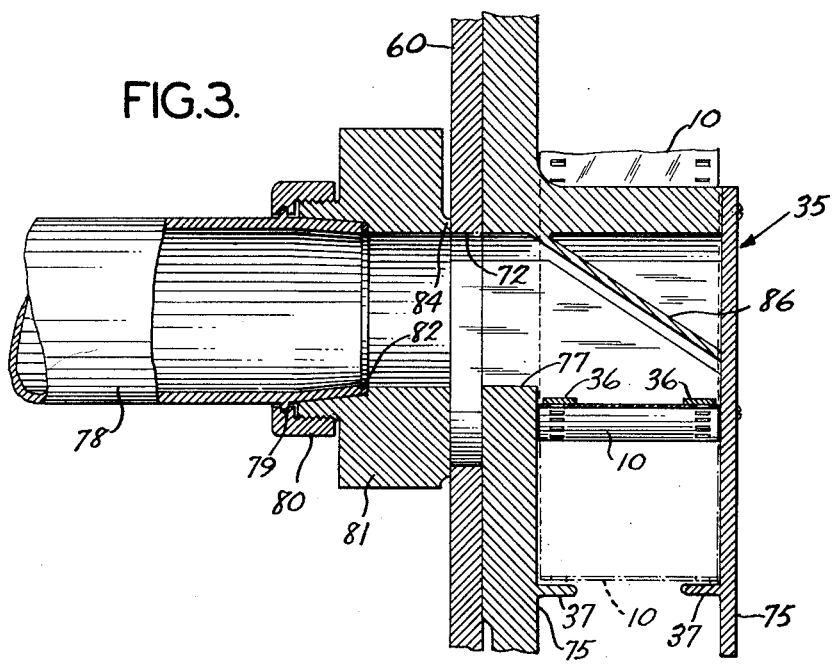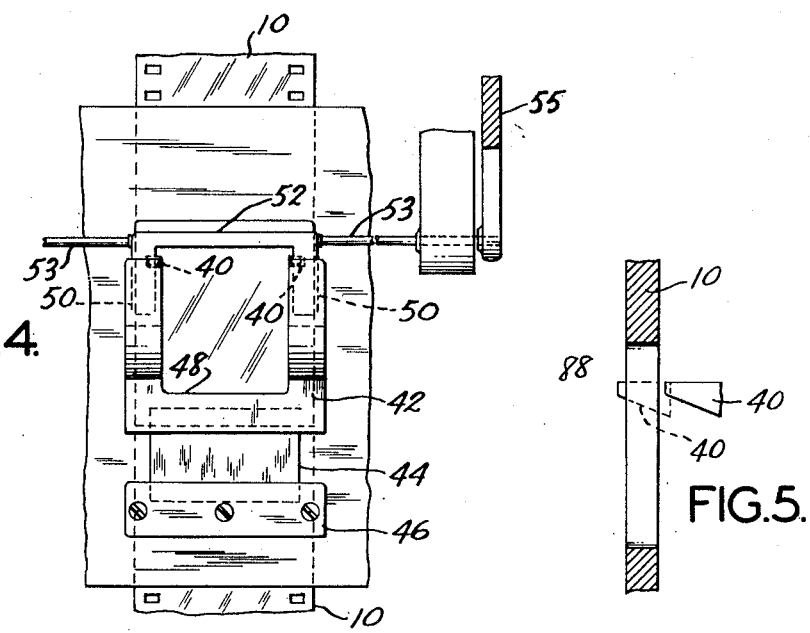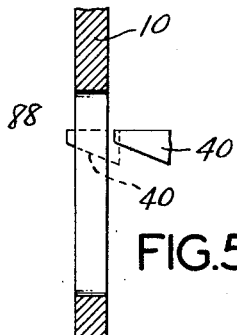

Patented June 24, 1952

2,601,347

UNITED STATES PATENT OFFICE 2,601,347

MOTION-PICTURE APPARATUS WITH PNEUMATIC PULLDOWN FOR FILM

Fred Waller, Huntington, N. Y., assignor to The Vitarama Corporation, Huntington Station, N. Y., a corporation of New York Application June 24, 1949, Serial No. 100,985

18 Claims. (Cl. 88—18)

This invention relates to method and apparatus for moving the film in motion picture cameras or projectors, including background cameras, and allied arts such as printers. The invention relates more particularly to a pneumatic pull down in which air pressure behind a loop of the film supplies the force to move the film strip from one picture frame to the next.

One object of the invention is to provide an improved pull down which moves the film faster so that a longer period of time is available for exposing each film frame in a camera, or for displaying the film frame from a projector. One improved feature of the invention is the use of air pressure to move the film in place of the conventional pull down claws, and this feature saves wear on the edges of the sprocket openings of the films even though the films are being moved more quickly when a frame is changed. Another feature relates to the absorbing of the stopping shock by snubbing the film on a curved surface instead of putting the strain on the edges of the sprocket openings with consequent eventual distortion of the sprocket openings. With this invention the wear is removed from the sprocket tooth openings and distributed over the surface of the film.

Another object of the invention is to provide a pull down, for motion picture films, that has fewer mechanical parts than conventional pull downs; that is quiet; and that locates successive film frames with extreme accuracy suitable for mosaic pictures in which images from different projectors are displayed on a common screen immediately adjacent one another and in such relation as to make up a large composite picture. No matter how accurately the projectors for a mosaic picture may be adjusted, perfect registration of the pictures cannot be obtained if the separate films were exposed in cameras that did not accurately position the successive frames. This invention is preferably used, therefore, in both the cameras and the projectors for mosaic picture work.

Other objects, features and advantages of the invention will appear or be pointed out as the description proceeds.

Figure 1:
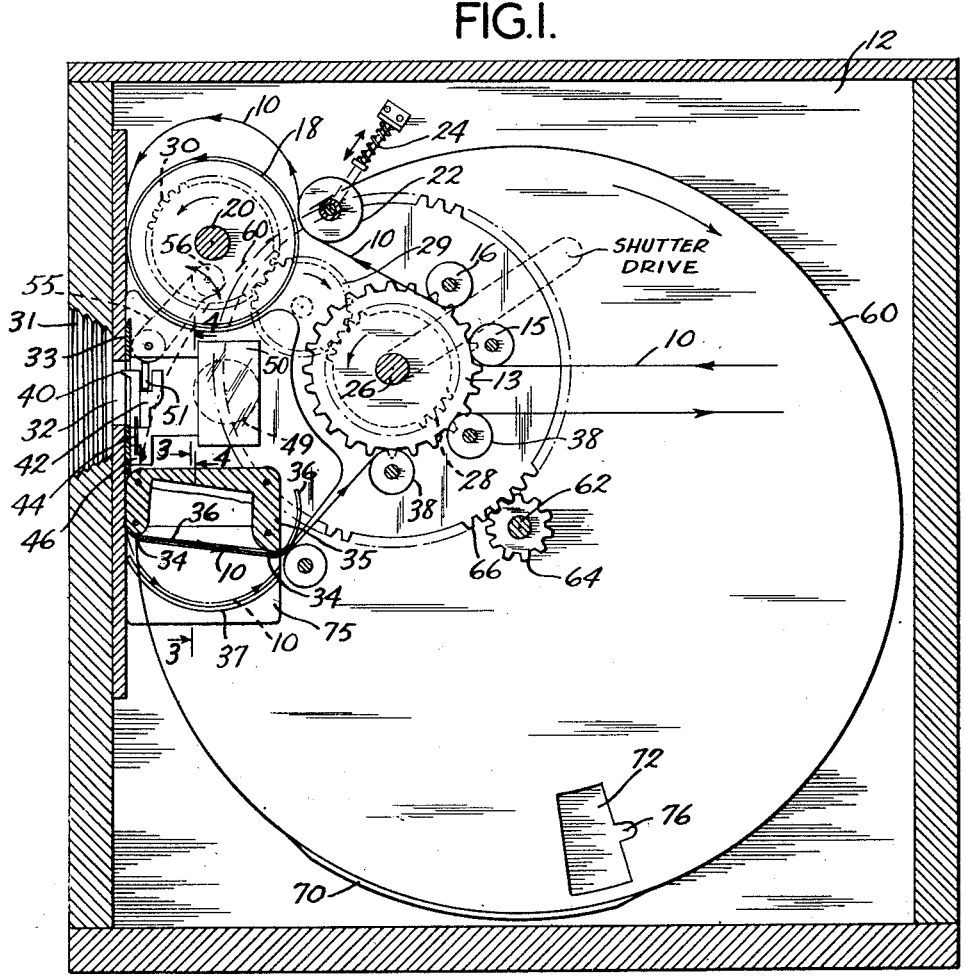
Figure 2:
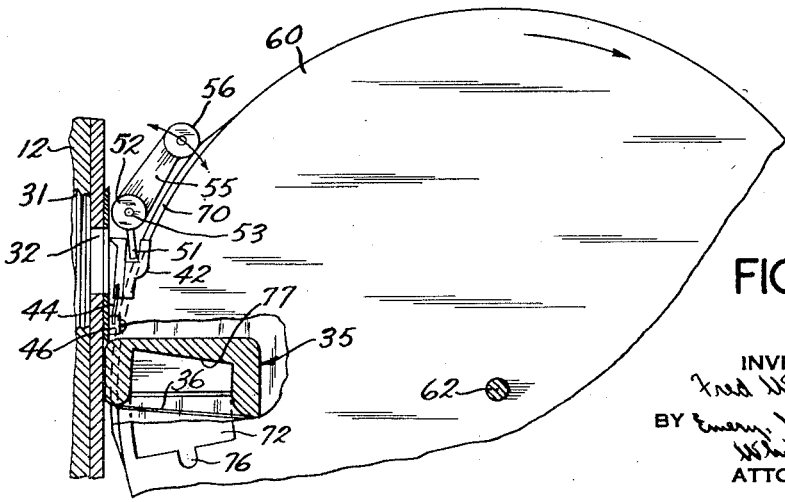

In the drawing forming a part hereof, in which like reference characters indicate corresponding parts in all the views, Fig. 1 is a side view, partly in section, showing a motion picture projector having a pull down which includes the features of this invention, Fig. 2 is a fragmentary view of a portion of the apparatus shown in Fig. 1 with the parts in different positions, Fig. 3 is an enlarged sectional view taken on the line 3—3 of Fig. 1, Figure 4 is an enlarged sectional view taken on the line 4—4 of Fig. 1, Figure 5 is a fragmentary diagrammatic view illustrating the way in which the film is positioned by the registration pins of the apparatus.

A motion picture film 10, from a reel in a magazine, is pulled into a camera or projector housing 12 in the direction indicated by the arrow in Fig. 1. This motion is imparted to the film 10 by a sprocket 13 against which the film 10 is held by rollers 15 and 16. The sprocket rotates continuously at uniform speed.

From the sprocket 13, the film 10 travels up to a roller 18 secured to a shaft 20. The film 10 is guided above the roller 18 by an auxiliary roller 22. This auxiliary roller 22 is supported from the housing 12 by a sliding support and is urged downward against the film by a spring 24.

The sprocket 13 is secured to a power shaft 26 which also operates the shutter of the camera or projector. A gear 28, also secured to the power shaft 26, drives a similar gear 30 through an idler 29 which causes the gear 30 to turn in the same direction as the gear 28. The gear 30 is secured to the shaft 20 and rotation of this gear 30, therefore, causes the roller 18 to rotate at the same time in the direction indicated by the arrows.

The roller 18 is of the same diameter as the sprocket 13, and in order to have the film advance at the same lineal speed around both the sprocket 13 and roller 18, these elements are rotated at the same speed. This equality of speed is obtained by having the gears 28 and 30 of the same size. When there is no pull exerted on the film 10 beyond the roller 18, however, or when movement of the film beyond the roller 18 is blocked by registration pins in the sprocket openings, the film 10 accumulates slack over the roller 18 and forms a loop as indicated by the solid line position of the film 10 above the roller 18.

After passing around substantially one-half of the periphery of the roller 18, which is preferably covered with rubber, the film 10 passes downward behind a lens mount 31 and across a film gate 32. The film is held against the film gate by a pressure plate 33 in accordance with conventional practice. Below the film gate 32, the film 10 passes across lips 34 of an air chest 35. Just before the parts of the machine are in position to start the next pull down operation, the film 10 is in substantially the straight line position indicated by the full line between the lips 34 of the air chest.

There are flexible strips 36 (Fig. 3), which are preferably light strips of spring steel, extending across the open end of the air chest 35 at opposite sides of the air chest in position to overlie the sprocket openings in the film 10. The purpose of these strips 36 is to prevent the escape of air through the sprocket openings. If they are not employed, a substantially larger amount of air is necessary to operate the invention.

When air under pressure comes into the air chest 35 above the film, the strips 36 and the film 10 are pushed downwardly until the film comes close to the ribs 37 located below the film 10 and extending inwardly under the sprocket openings so as to supplement the strips 36 in preventing the escape of air through the sprocket openings. The apparatus is designed so that the film approaches the ribs 37 at substantially the same time as it is snubbed on the surface of the roller 18. The strips 36 and the ribs 37 are preferably made with smooth and polished surfaces and do not extend into the picture area of the film so as to avoid danger of scratching.

After passing beyond the air chest, the film 10 moves upward to the sprocket 13 where it is again engaged by the sprocket teeth which advance it on its way back to another magazine in which the reel is turned in a direction to wind up the film.

The sprocket 13 is preferably toothed for engaging sprocket openings along both sides of the film strip, and in the construction illustrated the film 10 is fed from the magazine and back to the magazine by the same sprocket 13. This insures perfect equality of the film speed as it is fed toward and from the pull down apparatus, but the construction is better suited to cameras than projectors. For professional projectors where a strong light is required, the feed and takeup functions are divided between two sprockets, in place of the sprocket 13, so as to provide a clear light path from the rear of the housing 12. The film 10 beyond the air chest 35 is held in engagement with the teeth of the sprocket 13 by rollers 38 which correspond with the rollers 15 and 16 on the upper side of the film advancing apparatus.

At the film gate 32 there are registration pins 40 for engaging one sprocket opening on each side of a film frame. These registration pins control the final positioning of the film frame after each movement of the film. The registration pins 40 extend from a pin holder 42 which is connected at its lower end to a spring 44. The bottom of the spring 44 is secured to a block 46 which is supported from the housing 12.

The pin holder 42 can be solid at the back of the film when used in a camera; but for projector use, the pin holder 42 has its center portion cut away along an edge 48 (Fig. 4) so as to leave an open frame through which light can pass for projecting the image of the film frame on a screen. In the construction illustrated, in which the single sprocket 13 blocks the access of light from beyond the film sprocket, light for projection is supplied from a light source 49, at one side of the housing 12, and the light beam is reflected through the film at the gate 32 by a prism 50.

The upper ends of the pin holder 42 are forked to provide a clearance into which crank arms 51 extend. These crank arms 51 extend downward from a common hub 52 secured to a shaft 53; and the shaft is connected at one end with a crank 55 that supports a cam follower 56 in position to contact with the peripheral face of a cam 60.

This cam 60 is secured to a shaft 62 extending transversely in the projector housing 12. A pinion gear 64, also secured to the shaft 62 meshes with a large spur gear 66 on the power shaft 26. Because of the large diameter of the gear 66, and the small diameter of the pinion gear 64, the shaft 62 and cam 60 are rotated at a higher speed than the power shaft 26 and sprocket 13. For example, if the film 10 has six-tooth picture frames, and the sprocket 13 has 24 teeth so that the film is advanced four frames each time that the sprocket 13 makes one revolution, then the pitch diameters of the gears 64 and 66 are so chosen as to obtain a speed ratio of 4 to 1. This makes the cam 60 turn through one complete revolution each time that the sprocket 13 advances the film 10 for the distance of one film frame.

The cam 60 has a circular peripheral surface throughout most of its angular extent, but there is a high segment 70 extending angularly around a portion of the periphery of the cam 60; and this high segment 70 displaces the cam follower 56 and rocks the crank arms 51 far enough to swing the pin holder 42 inward until the registration pins 40 have been withdrawn from the sprocket openings in the film, as shown in Fig. 2. The angular extent of the segment 70 is sufficient to hold the registration pins 40 from the film during the time that the film is being moved.

There is a port 72 opening through the cam 60 in a predetermined relation to the cam operating segment 70. This port 72 controls the admission of air into the air chest 35 and the port is so located that air begins to enter the chest 35 at substantially the same time that the cam 60 causes the registration pins 40 to begin their withdrawal from the sprocket openings in the film.

By the time that the air pressure in the chest 35 has increased sufficiently to be effective, the registration pins 40 are fully withdrawn from the sprocket openings in the film. The puff of air into the chest 35, and against the portion of the film 10 that spans the opening in the air chest between the lips 34, displaces the film 10 downward from the full line position shown in Fig. 1 to the dotted line position. Even with the film 10 in the dotted line position, the air cannot escape sidewise because the film is always confined between downwardly extending side plates 75 which serve a dual function. They prevent the escape of air beyond the edges of the film, and and they also serve as edge guides for the film.

During the time interval between successive puffs of air from the air chest 35, the film 10 accumulates a loop of slack above the roller 18 since the sprocket 13 runs continuously. Whenever the film 10 is displaced by a puff of air from the chest 35, the air moves the film downward at a rapid rate until the slack above the roller 18 is eliminated and the film is snubbed on the roller 18, and approaches the ribs 37. Thereafter the pressure of the air holds the film in contact with the roller 18 so that the film at the gate continues its downward movement at a slower rate under the control of the roller 18 as that roller turns in the direction to permit advance of the film toward the gate, and under control of the sprocket 13 which draws film as fast as it is fed downward by the roller 18.

The pressure of air from the air chest 35 is continued against the film at a reduced value, by having a narrow portion 76 of the port 72 supply the air to the chest 35 after the film has already been moved downward far enough to take up all of the slack accumulated above the roller 18. This continued air pressure is sufficient to hold the film in contact with the top surface of the roller 18 and to prevent the collapsing of the loop that is close to the ribs 37 by the pull of the take-up sprocket 13. It is during this period, after the film has been snubbed against the roller 18, that the registration pins 40 come into position and stop further downward movement of the film so that a new loop of film will accumulate above the roller 18 in preparation for the next puff of air from the chest 35.

With mechanical pull-down mechanisms, the speed with which the film is moved is limited by the strain which the sprocket openings can withstand. Any mechanisms that wear the films excessively are unsatisfactory. With this invention, utilizing the pressure of the air to move the film, it is practical to impart much more rapid movement to the film than in the case of mechanical pull-down mechanisms. This is particularly advantageous with intermittent film moving mechanisms that are used with shutters because it permits the shutter to remain open for a much longer period of time.

Fig. 3 shows the relation of the cam 60 to the air chest 35 and illustrates the way in which the supply of air to the chest 35 is controlled by the port 72 in the cam 60. The air chest 35 has a port 77 which in the construction illustrated is substantially the same size as the wide portion of the port 72 in the cam 60. The front face of the cam 60 is close to the rearward end of the port 77, there being merely a running clearance which is not sufficient to permit the escape of any substantial quantity of air at the pressures used for this invention. A pressure of approximately five pounds has proved sufficient in practice, but this is given merely by way of illustration.

On the rearward side of the cam 60 there is an air supply pipe or conduit 78 which has a flange 79 near one end, and a coupling nut 80 that clamps against one side of the flange and that threads over a nozzle fitting 81 on the other side of the flange. The end of the conduit 78, which extends into the nozzle fitting 81, is tapered and fits into a corresponding taper in the nozzle fitting. A gasket 82 between the end of the conduit 78 and a shoulder in the nozzle fitting 81 insures a tight seal between the conduit and the nozzle fitting.

At the end of the nozzle fitting 81 there is a boss 84 which comprises the discharge nozzle of the fitting. This boss has a running clearance with the rearward face of the cam 60, and the cam 60 serves as a valve for putting the nozzle fitting 81 into communication with the air chest 35 for a limited period of time during each revolution of the cam 60. A baffle 86 in the air chest deflects the air stream downward against the film 10 so as to equalize the air pressure across the width of the film.

Figure 5 illustrates the way in which the registration pins 40 control the accurate positioning of the film 10. When the initial downward movement of the film by the air puff is completed, and the film has been snubbed around the upper feed roller as previously explained, the registration pins 40 are at levels slightly below the top of the sprocket openings 88 of the film 10.

While the registration pins 40 advance from the full line to the dotted line positions shown in Figure 5, the film 10 advances until the top edges of the sprocket openings 88 come into contact with the registration pin 40. It will be apparent, therefore, that the final movement of the film 10, which follows the rapid movement by the air puff, is very small, amounting to less than the length of a sprocket opening.

By having the registration pins 40 contact with only the upper edge of the sprocket opening 88, more accurate registration is obtained, and it is not necessary to maintain a fit of the registration pins and the dimensions of the sprocket openings in the film.

Terms of orientation throughout the specification and claims are, of course, relative. The preferred embodiment of the invention has been illustrated and described, but changes and modifications can be made and some features of the invention can be used alone or in different combinations without departing from the invention as defined in the claims.

I claim as my invention:

1. Apparatus for moving a film in a motion picture camera, projector or printer, said apparatus comprising a continuously operating feed device that accumulates a loop of film ahead of a film gate, an air chest having a port across which the film passes beyond the gate, valve means that open intermittently to supply air to the air chest for discharge from the port and against the film to pull the film and eliminate the loop ahead of the gate while accumulating a corresponding loop at a region beyond the gate, a retarder that slows down the movement of the film during the latter part, and only during the latter part, of the movement of the film by the air at each successive operation of the valve means, a registration pin that is of less height than a sprocket opening when fully inserted into the sprocket opening, mechanism that moves the registration pin into and out of the sprocket openings at a location adjacent to the film gate, control means that operate the pin-moving mechanism in one direction after the operation of said retarder and while the air is supplied to the air chest and in the other direction after operation of the valve means to cut off the air supply to the air chest, and driving means for operating the valve means and said mechanism at a controlled speed.

2. Apparatus for moving a film intermittently to bring successive film frames into position at a film gate of motion picture equipment, said apparatus comprising a feed device that accumulates a loop of film ahead of the gate, an air chest having a port across which the film passes beyond the gate, valve means for supplying air to the air chest to exert a pressure against the film across the port and pull the film past the gate, a retarder that slows down the movement of the film during the latter part, and only during the latter part, of the movement of the film by the air at each successive operation of the valve means, and a registration pin that moves into the sprocket openings of the film to register successive film frames with the gate, a shutter driving connection, mechanism that moves the valve to determine the beginning and duration of the period of air pressure against the film, mechanism that moves the registration pin into and out of the sprocket openings at a location adjacent to the film gate, and common driving means that operate the valve means, shutter driving connection and said mechanism in timed relation and at a controlled speed.

3. A pneumatic pull down apparatus for imparting intermittent movement to a film in a motion picture camera or projector including film feeding mechanism that accumulates a loop ahead of a film gate of the apparatus, an air chest having a port across which the film passes beyond the gate, a registration pin that moves into and out of sprocket openings of the film for controlling the registration of successive film frames with the gate, and a cam for operating the registration pin, said cam having a port opening therethrough movable along a course that controls the supply of air to the air chest.

4. A pneumatic pull down device for imparting intermittent movement to a film past a film gate of a motion picture camera or projector including, in combination, a feed device that accumulates a loop of film above the gate, an air chest having a port across which the film passes below the gate, a registration pin that moves into and out of sprocket openings in the film for registering successive film frames with the gate, valve means controlling the supply of air to the air chest, said valve means having ports of different size and being movable into different positions to make the respective ports control the flow of air to the chest, one of said ports being substantially larger than the other, mechanism that operates the valve means into its different positions successively through a cycle, other mechanism that withdraws the registration pins from the film sprocket openings before the valve means moves into position to make the larger port control the air flow, and that moves the registration pins into engagement with the sprocket openings while the valve means is in position to make the smaller port control the air flow, and driving means that operate all of said mechanism in their timed relation to one another.

5. Film moving apparatus for advancing a film intermittently to bring successive film frames into registration with a film gate, said apparatus comprising a curved surface located above the film gate, a feed device that accumulates a loop of film above the curved surface, an air discharge device having a port across which the film moves beyond the gate, valve means for supplying air to said port for discharge against the film to move the film downward until the accumulated loop is eliminated and the film is snubbed over the curved surface above the gate, a registration pin movable into and out of sprocket openings of successive film frames for registering the film with the gate, said curved surface being movable with the film during a final downward movement of the film into contact with the registration pin after the snubbing of the film on said curved surface.

6. Film moving apparatus for bringing successive film frames into register with a film gate, a roller above the film gate, a feed device that accumulates a loop of film above the roller, an air chest having a port across which the film passes beyond the film gate, valve means for supplying air to the air chest for discharge against the film to pull the film downward until the loop is eliminated and the film is snubbed on the surface of said roller, a registration pin movable into and out of sprocket openings in the film, mechanism for operating the valve and registration pin in timed relation with one another, and mechanism for turning said roller to control the advance of the film with respect to the registration pin after the film has been snubbed on said roller.

7. Apparatus for feeding a motion picture film intermittently past a film gate, said apparatus including a roller having a smooth peripheral surface across the full width of the film, said roller being located above the film gate and in such position that the film passes from one region of the periphery of the roller toward the film gate, means feeding the film to said roller at a region upstream from that region where the film passes from the roller toward the gate, a registration pin that holds the film against movement past the gate while slack accumulates in the film above said roller, mechanism for moving the registration pin into and out of engagement with sprocket openings in the film frame, a device that applies air pressure to the film below the film gate to pull the film downward and against the surface of the roller when the registration pin is out of engagement with the sprocket openings, and mechanism for operating the registration pin and said device in timed relation with one another.

8. Apparatus for imparting intermittent movement to a motion picture film, said apparatus comprising a pin that engages sprocket openings in successive film frame areas to maintain the successive film frames in register with a film gate, a feeding device that accumulates a loop of film ahead of the film gate when the film is held against movement by the registration pin, an air chest having a port across which the film passes beyond the gate, imperforate side plates along both edges of the film in the region of the air port, said imperforate side plates extending away from the air port far enough to confine the edges of the film and the air behind them for all positions of the film, valve means that control the supply of air to the air chest, said valve means having ports of different size and being movable into different positions to make the respective ports control the flow of air to the chest, one of said ports being substantially larger than the other, mechanism that operates the valve means into its different positions successively through a cycle, other mechanism that withdraws the registration pins from the film sprocket openings before the valve means moves into position to make the larger port control the air flow, and that moves the registration pins into engagement with the sprocket openings while the valve means is in position to make the smaller port control the air flow, and driving means that operate all of said mechanism in their timed relation to one another.

9. Film moving apparatus comprising a curved surface above which a film passes before traveling to a film gate, a feeding device for accumulating a loop film above the curved surface, an air chest having a port across which the film passes below the film gate, means for supplying air to the air chest to thrust the film away from the orifice and to pull the film downward past the film gate until the loop is snubbed on said curved surface, a registration pin movable into and out of sprocket openings of the successive film frames, mechanism for operating the registration pin in timed relation with the supplying of air to the air chest, side plates along the edges of the film for preventing the escape of air around the edges of the film, and means for applying a reduced air pressure against the film after the film has been moved far enough to snub the film on the curved surface, said curved surface being movable toward the gate to allow a final limited movement of the film into position to be registered with the film gate by said pin.

10. Apparatus for moving a film in a motion picture camera or projector, said apparatus comprising a curved surface free of sprocket teeth and located ahead of a film gate in position to snub a film that is pulled down to the film gate, a continuously operating feed device that accumulates a loop of film above the curved support ahead of the film gate, an air chest having a port across which the film moves beyond the gate, valve means for supplying air to the air chest for discharge from the port and against the film to pull the accumulated loop to a region beyond the gate until the film ahead of the gate is snubbed on the curved support, said support being movable in the direction of movement of the film toward the film gate after snubbing to effect final registration of each film frame with the gate, and means that move the support through a limited displacement longitudinally of the film after the completion of the snubbing.

11. Apparatus for moving a film intermittently to bring successive film frames into position at a film gate of a motion picture camera or projector, said apparatus comprising a feed device that accumulates a loop of film ahead of the gate, an air chest having a port across which the film passes beyond the gate, valve means for supplying air to the air chest to exert a pressure against the film, where it passes across the port, to pull the accumulated loop of film downward past the gate, a roller ahead of the gate and under the region of the loop accumulation in position to snub the movement of the film when the loop is eliminated by advancement past the gate, said roller being rotatable in a direction that permits advance of the film further toward the gate for final registration of successive film frames with the gate.

12. Film moving apparatus for advancing a film intermittently to bring successive film frames into registration with a film gate, said apparatus comprising a curved surface located above the film gate, a feed device that accumulates a loop of film above the curved surface, an air discharge device having a port across which the film passes beyond the gate, valve means for supplying air to said port for discharge against the film to move the film downward until the accumulated loop is eliminated and the film is snubbed over the curved surface above the gate, said curved surface being movable with the film during a final downward movement of the film into position to register a film frame with the gate after the snubbing of the film on said curved surface.

13. Film moving apparatus for bringing successive film frames into register with a film gate, a roller above the film gate, a feed device that accumulates a loop of film above the roller, an air chest having a port across which the film passes beyond the film gate, valve means for supplying air to the air chest for discharge against the film to pull the film downward until the loop is eliminated and the film is snubbed on the surface of said roller, mechanism for operating the valve, and mechanism for turning said roller to control advance of the film toward the film gate after the film has been snubbed on said roller.

14. Apparatus for feeding a motion picture film intermittently past a film gate, said apparatus including a roller having a smooth peripheral surface across the full width of the film, said roller being located ahead of the film gate and in such position that the film passes from one region of the periphery of the roller toward the film gate, means feeding the film to said roller at a region ahead of that from which the film passes from the roller toward the gate, a device that applies air pressure to the film below the film gate to pull the film downward and against the surface of the roller, and mechanism for operating said device and for rotating said roller in timed relation with one another.

15. Film moving apparatus comprising a curved surface above which a film passes before traveling to a film gate, a feeding device for accumulating a loop of film above the curved surface, an air chest having a port across which the film passes below the film gate, means for supplying air to the air chest to thrust the film away from the orifice and to pull the film downward past the film gate until the loop is snubbed on said curved surface, side plates at the air chest along the edges of the film for preventing the escape of air around the edges of the film, and means for applying air at reduced pressure against the film after the film has been moved far enough to snub it on the curved surface, said curved surface being movable toward the gate as continued pressure of air against the film imparts a final limited movement to the film and moves it into position to register each successive film frame with the film gate.

16. Film moving apparatus comprising a feed device that accumulates a loop of film ahead of a film gate, an air chest beyond the film gate with an opening across which the film passes, a flexible strip extending across the opening in the air chest above a portion of the film in which there are sprocket openings, said strip being movable with the film away from the opening when subjected to a puff of air from the chest, side plates for preventing the escape of air around the side edges of the film as the film and strip are pushed away from the openings in the air chest, and valve means for supplying air to the chest at predetermined intervals.

17. Film moving apparatus including feeding mechanism that accumulates a loop of film ahead of a film gate, an air chest with an opening across which the film passes beyond the film gate, side walls extending away from the air chest at opposite sides of the film and adjacent to the edges of the film, valve means that supply air periodically to the air chest to thrust the film away from said opening and into new positions between the side walls until a length of film equivalent to the loop has been pulled past the film gate, an abutment that is located ahead of the film gate and on which the film is snubbed upon elimination of the loop, and shelf means extending from the walls and across the space between the walls on the side of the film opposite the air chest and at a position to be contacted by the film when a length of film equivalent to the loop has been added to the length of film between said walls.

18. A pneumatic pull down apparatus for imparting intermittent movement to a film in a motion picture camera or projector including film feeding mechanism that accumulates a loop ahead of a film gate of the apparatus, an air chest having a port across which the film passes beyond the gate, a registration pin smaller than sprocket openings in the film and that moves into and out of the sprocket openings of the film for controlling the registration of successive film frames with the gate, valve means having an element movable along a course to control the supply of air to the air chest, and means for operating the registration pin in timed relation with the valve means, at least a part of the operating means for the registration pin being connected to and operated by the valve means to engage the film after the valve means moves into a position to supply air to the chest and before said valve means move into a position to shut off air from the chest.

FRED WALLER.

REFERENCES CITED

The following references are of record in the file of this patent:

UNITED STATES PATENTS

| Number | Name | Date |
|---|---|---|
| 1,244,919 | Thomas | Oct. 30, 1917 |
| 1,244,920 | Thomas | Oct. 30, 1917 |
| 1,309,471 | Evans | July 8, 1919 |
| 1,912,535 | Mitchell | June 6, 1933 |
| 1,944,500 | Garde | Jan. 23, 1934 |
| 2,037,124 | Fear | Apr. 14, 1936 |
| 2,373,243 | Grimson | Apr. 10, 1945 |